United States Patent
Kaasalainen et al.

(10) Patent No.: US 11,223,991 B2
(45) Date of Patent: Jan. 11, 2022

(54) CONNECTION ESTABLISHMENT IN INTER-RAT COMMUNICATION SYSTEM

(71) Applicant: Nokia Technologies Oy, Espoo (FI)

(72) Inventors: Janne Kaasalainen, Söderkulla (FI); Subramanya Chandrashekar, Bangalore (IN); Tsunehiko Chiba, Saitama (JP); Raghuram Reddy Krishnamurthy, Bangalore (IN); Pradeep Basavapura Veerabhadra Reddy, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/761,425

(22) PCT Filed: Oct. 9, 2018

(86) PCT No.: PCT/FI2018/050720
§ 371 (c)(1),
(2) Date: May 4, 2020

(87) PCT Pub. No.: WO2019/097110
PCT Pub. Date: May 23, 2019

(65) Prior Publication Data
US 2020/0396667 A1    Dec. 17, 2020

(30) Foreign Application Priority Data
Nov. 15, 2017   (IN) .............................. 201741040839

(51) Int. Cl.
*H04W 36/22*    (2009.01)
*H04W 76/27*    (2018.01)
(Continued)

(52) U.S. Cl.
CPC ............. *H04W 36/22* (2013.01); *H04W 8/24* (2013.01); *H04W 48/18* (2013.01); *H04W 48/20* (2013.01); *H04W 76/27* (2018.02)

(58) Field of Classification Search
CPC ..... H04W 48/18; H04W 48/20; H04W 36/22; H04W 76/27; H04W 8/24
(Continued)

(56) References Cited

U.S. PATENT DOCUMENTS

| 7,257,403 B2 | 8/2007 | Nikkelen |
| 9,084,169 B2 * | 7/2015 | Cui ........................ H04W 48/18 |

(Continued)

FOREIGN PATENT DOCUMENTS

| WO | 2017/121485 A1 | 7/2017 |
| WO | 2017/173051 A1 | 10/2017 |
| WO | 2018/172596 A1 | 9/2018 |

OTHER PUBLICATIONS

"3rd Generation Partnership Project; Technical Specification Group Radio Access Network; NG-RAN; Architecture description(Release 15)", 3GPP TS 38.401, V0.2.0, Jul. 2017, pp. 1-20.

(Continued)

*Primary Examiner* — William Nealon
(74) *Attorney, Agent, or Firm* — Nokia Technologies Oy (57) ABSTRACT

There is provided a method, comprising: detecting, by a first network node from a user equipment, a connection request to a first radio access technology, RAT; determining, before the user equipment is switched to a connected state in the first RAT, whether a second RAT is more suitable to serve the user equipment than the first RAT; and upon deciding that the second RAT is more suitable, providing the user equipment with connection information of the second RAT, (Continued)

```
┌─────────────────────────────────────────────────┐
│ 350 obtaining, by a network node, an enquiry of │
│ connection information of a second RAT for a UE │
│      attempting to connect to the first RAT     │
└─────────────────────────────────────────────────┘
                        ↓
┌─────────────────────────────────────────────────┐
│ 352 determining connection information of the second RAT │
│         for the UE based on the request and    │
│  providing the connection information to the first RAT │
└─────────────────────────────────────────────────┘
                        ↓
┌─────────────────────────────────────────────────┐
│ 354 detecting a connection request to the second RAT │
│  from the UE based on the connection information and │
│      establishing a connection with the UE     │
└─────────────────────────────────────────────────┘
``` wherein the connection information causes the user equipment to directly connect with the second RAT instead of the first RAT.

13 Claims, 7 Drawing Sheets

(51) Int. Cl.
*H04W 8/24* (2009.01)
*H04W 48/18* (2009.01)
*H04W 48/20* (2009.01)

(58) Field of Classification Search
USPC .......................................................... 370/331
See application file for complete search history.

(56) References Cited

U.S. PATENT DOCUMENTS

| | | | |
|---|---|---|---|
| 9,264,984 B2* | 2/2016 | Lee ....................... | H04W 48/16 |
| 2008/0045262 A1 | 2/2008 | Phan et al. | |
| 2010/0009682 A1 | 1/2010 | Iwamura et al. | |
| 2010/0255836 A1* | 10/2010 | Chen ..................... | H04W 48/18 |
| | | | 455/426.1 |
| 2014/0038609 A1 | 2/2014 | Henttonen et al. | |
| 2016/0100449 A1 | 4/2016 | Jang et al. | |
| 2016/0135247 A1 | 5/2016 | Ozturk et al. | |
| 2016/0277992 A1* | 9/2016 | Cao ....................... | H04W 76/27 |
| 2018/0139778 A1* | 5/2018 | Chou .................... | H04W 74/04 |
| 2019/0174554 A1* | 6/2019 | Deenoo ............... | H04W 56/001 |

OTHER PUBLICATIONS

"Deliverable D6.2 5G Asynchronous Control Functionsand Overall Control Plane Design", Metis II, Version: v1.0, Apr. 30, 2017, pp. 1-167.

"3rd Generation Partnership Project;Technical Specification Group Radio Access Network; NR; NR and NG-RAN Overall Description; Stage 2 (Release 15)", 3GPP TS 38.300, V1.0.1, Oct. 2017, pp. 1-62.

"Inter-RAT mobility in the RRC INACTIVE state", 3GPP TSG-RAN WG2 Meeting #97, R2-1701354, Agenda : 10.3.2, Samsung, Feb. 13-17, 2017, 4 pages.

International Search Report and Written Opinion received for corresponding Patent Cooperation Treaty Application No. PCT/FI2018/050720, dated Jan. 8, 2019, 15 pages.

Extended European Search Report received for corresponding European Patent Application No. 18879384.8, dated Jul. 22, 2021, 11 pages.

* cited by examiner

400 causing by a UE, to a first network node, a transmission of a connection request with respect to a first RAT 402 causing reception of connection information of the second RAT from the first network node before the UE is switched to a connected state in the first RAT 404 establishing a connection directly with the second RAT based on the received connection information, instead of establishing a connection with the first RAT.

CONNECTION ESTABLISHMENT IN INTER-RAT COMMUNICATION SYSTEM

RELATED APPLICATION

This application was originally filed as Patent Cooperation Treaty Application No. PCT/FI2018/050720 filed on Oct. 9, 2018, which claims priority from Indian Patent Application No. 201741040839, filed on Nov. 15, 2017, which is hereby incorporated in its entirety.

FIELD OF THE INVENTION

The invention relates generally to wireless communications.

BACKGROUND

It is known that a user equipment may be in an idle or a in low activity mode/state. Upon a need of data transfer, it is important to switch the user equipment efficiently in a connected mode. However, in modern wireless communication systems with heterogenous networks this may not be straightforward.

BRIEF DESCRIPTION OF THE INVENTION

According to some aspects, there is provided the subject matter of the independent claims. Some further aspects are defined in the dependent claims.

LIST OF THE DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). The description may use terms radio access network (RAN) and RAT interchangeably.

The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integradable with existing legacy radio access technologies, such as the LTE.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

Figure 1A:
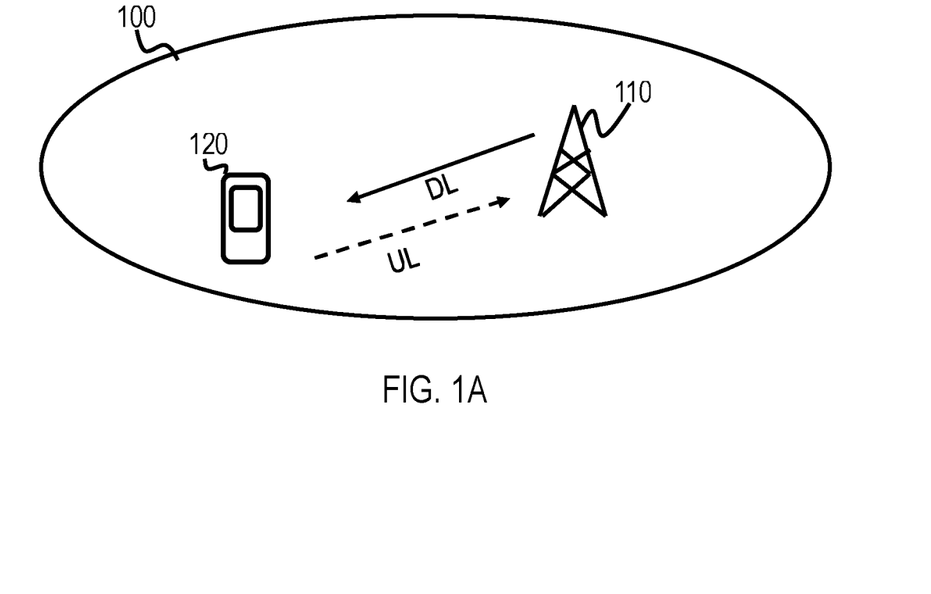
FIGS. 1A and 1B present communication networks, according to some embodiments.

FIG. 1A illustrates an example of a communication system to which embodiments of the invention may be applied. The system may comprise a control node 110 providing a cell 100. Each cell may be, e.g., a macro cell, a micro cell, femto, or a pico cell, for example. In another point of view, the cell may define a coverage area or a service area of the access node 110. The control node 110 may be an evolved Node B (eNB) as in the LTE and LTE-A, ng-eNB as in eLTE, or any other apparatus capable of controlling radio communication and managing radio re-sources within a cell. For 5G solutions, the implementation may be similar to LTE-A, or e.g. apply virtualized networks. The control node 110 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node 110 to the UE 120 and uplink (UL) communication from the UE 120 to the control node 110. Additionally, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within a macro cell. The operation of the local area access node may be controlled by an access node under whose control area the sub-cell is provided.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. An interface between an eLTE access point and a 5G access point may be called Xn. Other communication methods between the access nodes may also be possible. The access node 110 may be further connected via another interface to a core network of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and the core network may comprise an advanced mobility management entity (AMF) and a gateway node. The AMF may handle mobility of terminal devices in a tracking area encompassing a plurality of cells and handle signalling connections between the terminal devices and the core network. The gateway node may handle data routing in the core network and to/from the terminal devices.

Figure 1B:
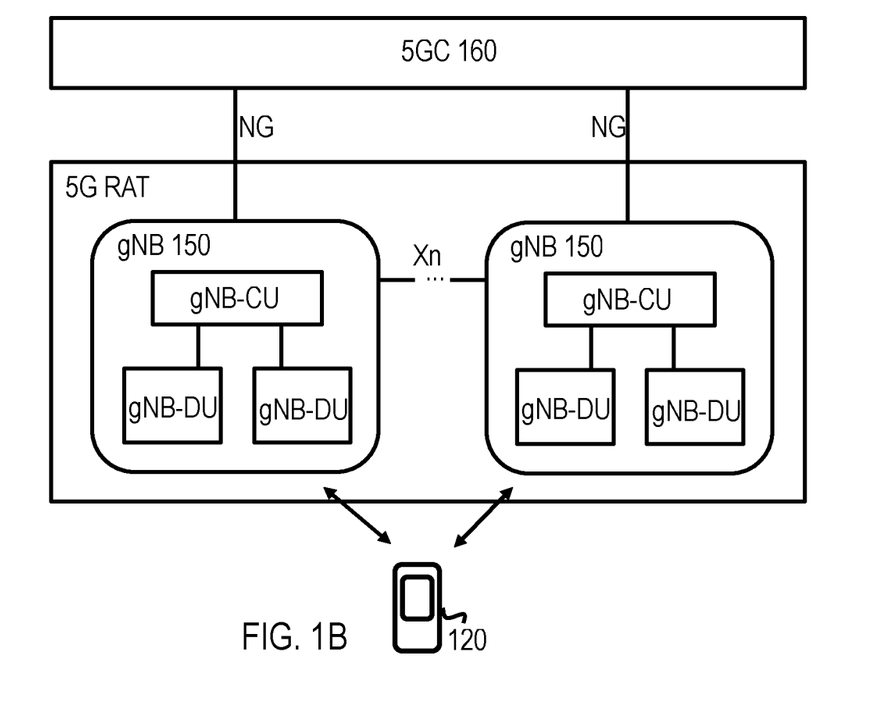

For 5G networks, it is envisaged that the architecture may be based on a so-called CU-DU (central unit-distributed unit) split, where one gNB-CU controls several gNB-DUs, as shown in FIG. 1B. The term 'gNB' may correspond in 5G to the eNB in LTE. The gNBs (one or more) may communicate with one or more UEs 120. As shown in FIG. 1B, the gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer. Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs 150 (access points/nodes), each comprising the CU and one or more DUs in the example of FIG. 1B, may be connected to each other via the Xn interface over which the gNBs may negotiate. The gNBs may also be connected over next generation (NG) interfaces to a 5G core network (5GC) 160, which may be a 5G equivalent for the core network of LTE.

Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RATs. Furthermore, it may be possible to have configurations where the full protocol stack is controlled by the same HW and handled by the same radio unit as the CU. Similar solutions have been considered also for eLTE/EUTRAT, so that eNB or ng-eNB (next generation eNB, i.e. an eNB that is connected to 5GC) might comprise central and distributed units, much like depicted in FIG. 1B for 5G.

When a system provides several RAT services, like 5G and (e)LTE, there may exist a problem of which one the UE should use for camping and initial access. Normally newer technology 5G is preferred, even though for some services the older LTE or eLTE could still provide better reliability and more capacity. Alternatively, older (e)LTE may provide better coverage and may be selected, although 4G/eLTE cannot provide all the needed services with the desired performance.

Figure 2:
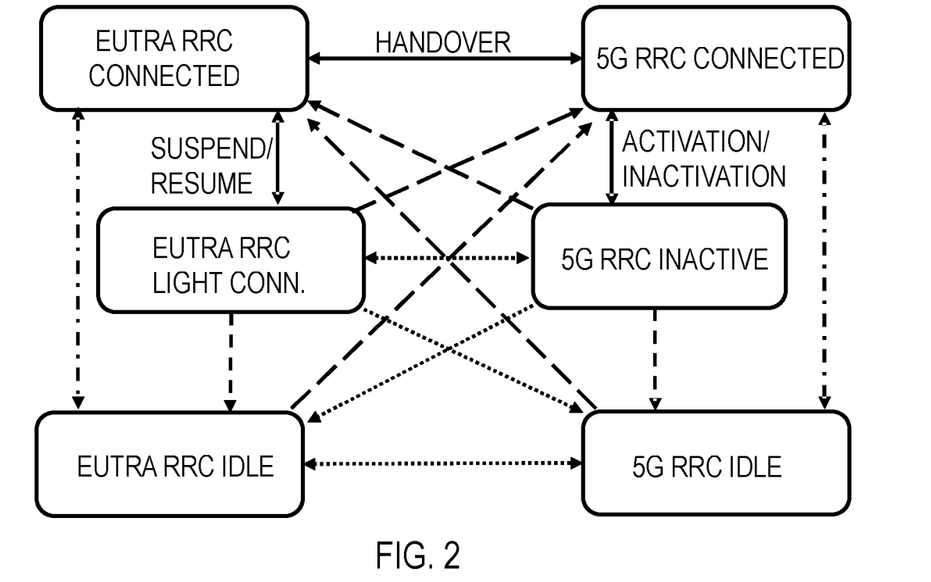
FIG. 2 shows radio resource control states of a user equipment and transitions between the states, according to some embodiments.

Typically, the change between RATs is done using methods, such as inter-system/inter-RAT handovers, reselections or fall-backs. A fall back between RATs is a procedure where UE ask e.g. a speech call from 4G but instead the network instructs the UE to use 3G. UE is moved back from RRC connected to idle and then UE makes a new request from 3G. Some of these methods require changes in RRC connection states/modes. FIG. 2 shows possible changes in the RRC states of a UE (such as UE 120) in connection of 5G and (e)LTE (i.e. EUTRA/EUTRAN). Dotted arrows denote reselections, which take place during idle or low activity modes (including inactive and light connection modes). Dashed arrows indicate releases to idle modes. Dot-dashed arrows indicate connection establishments to connected modes or releases to idle modes. The figure also shows that the UE 120 may switch from/to an EUTRA light connected state to/from a EUTRA RRC connected state via a resume/suspend processes, respectively. Recently a state called RRC inactive has been proposed in connection of 5G. The UE 120 in 5G/NR RRC inactive mode may switch to NR/5G RRC connected state via an RRC activation, and similarly move from the RRC connected state to the RRC inactive state via an RRC inactivation.

One problem with the above-mentioned methods (inter-system/inter-RAT handovers, fall-backs) is that those may only be started after the UE 120 has already had a dedicated connection (i.e. RRC connected state) to the first radio technology (e.g. 5G). If the initial radio technology, e.g. 5G, cannot provide the needed capacity and resources for the UE's requesting application, the request may need to be rejected and then the UE may need to make a new request or even wait and make the request again after a predetermined timer expiry. This may lead to latency and delays to get the needed service and resources for the connection.

To at least partially tackle this problem, there is proposed a solution for an expedited connection to a different RAT than the one with which the UE first requests connection to. This may be achieved by defining a method for a direct resource allocation to the best cell, directly to the best RAT, when the UE requests initial access to the network, without entering first to the RRC connected mode. This may enable efficient load and service control with fast cell and RAT/RAN change. The process may be controlled by an (ng-)eNB or by a gNB, or by a combined (ng-)e/gNB-CU (possible in case of collocated central nodes), or by a combined (ng-)e/gNB-DU (possible in case of collocated distributed nodes). The proposed functionality may make an improvement to the latency, because there is no need to use RRC connection reject or re-establishment procedures. Although applicable to many networks, we will in the following examples focus on 5G and eLTE, for the sake of simplicity.

Figure 3:
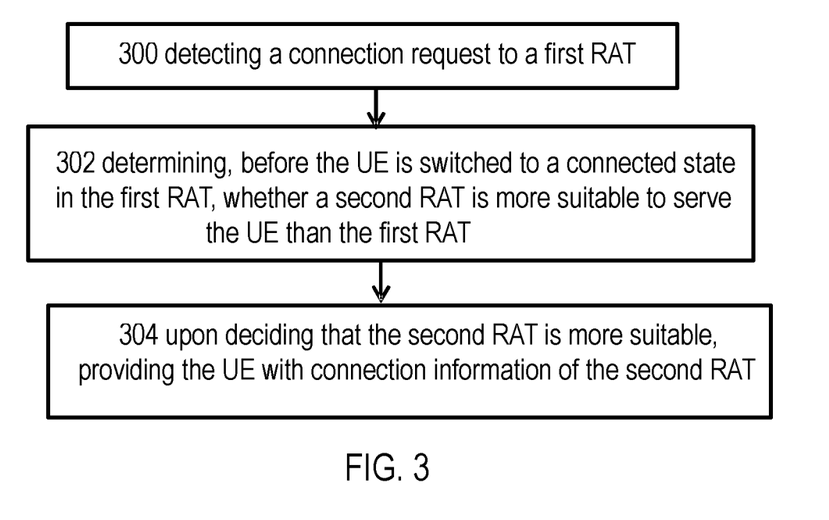
FIGS. 3, 4 and 10 show methods, according to some embodiments.

FIG. 3 depicts an example method. The method may be performed by a first network node, such as any control node of a relevant RAT including (for 5G) the gNB 150, gNB-CU, or gNB-DU (in case of CU-DU architecture), for example. For the sake of simplicity, let us assume in the description that the 5G with the gNB 150 is the first RAT with which the UE 120 initially tries to connect to, although it would be more suitable to connect with (e)LTE/EUTRA.

Accordingly, as shown in FIG. 3, the gNB may in step 300 detect from the UE 120 a connection request to the first RAT. It may be assumed that the first network node serves/controls at least the first RAT. E.g. the gNB serves the 5G RAT, or the (ng-)eNB serves the (e)LTE RAT, to mention only a few examples. However, in collocated scenarios, the 5G gNB-CU may at least partially control or be aware of also the (e)LTE RAT. This may be more feasible in case of an ng-eNB since it is connected to the same core network as gNB. E.g. relevant software in the central unit may control both resources and implement gNB-CU functionality and ng eNB-CU functionality.

The connection request may be e.g. a request message (e.g. an RRC connection request message or a RRC connection resume message) from the UE to the relevant control node (e.g. gNB 150) for requesting the receiving RAT to establish an RRC connection. In practice, it may be a request for switching the UE 120 to the 5G RRC connected state either from the 5G RRC idle state or from the 5G RRC inactive state (or from the LTE light connected state in case the request is for (e)LTE by a UE currently camping on an (e)LTE cell in the LTE light connected mode, instead of an UE currently camping on a 5G cell in the 5G RRC inactive mode). By (e)LTE it is meant that the RAT may be LTE (or variations thereof) where the control node is the eNB or the ng-eNB, depending on the implementation. The connection request may be sent in uplink by the UE 120 in e.g. in a signalling radio bearer (SRB0) on a common control channel (CCCH) because neither SRB1 nor a dedicated control channel (DCCH) has been setup at this point.

Some information elements (IEs) carried in such RRC connection request message may include: UE-Identity (Initial UE-Identity), establishmentCause including the main cause values and the corresponding NAS procedure which triggers the RRC connection establishment comprise e.g.: emergency (corresponding to non-access stratum (NAS) Procedure "MO-CS fallback Emergency call"); mt-Access (corresponding NAS procedures are "Service Request" or "Extended Service Request"); mo-Signalling (corresponding NAS procedures are Attach, Detach, and tracking area update, TAU); and moData (corresponding NAS Procedures are "Service Request" and "Extended Service Request"). The RRC establishment cause can be used by the network to prioritise the connection establishment request from the UE 120 at high load situations, for example.

Figure 5:
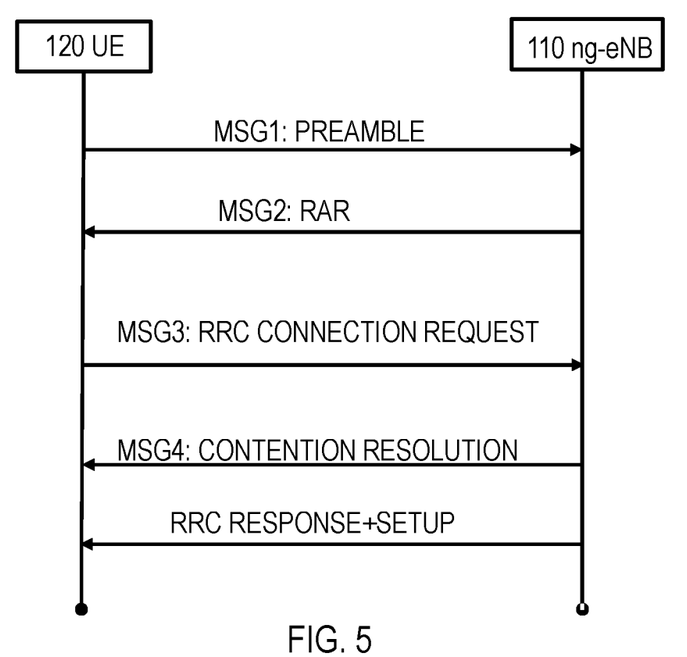
FIG. 5 shows a general overview of a contention based random access process.

Such a connection request detected in step 300 may be generated in an initial access procedure. One of such procedures may be carried out by means of a random access (RA) process/procedure (also known as a RACH process). So, the gNB may receive the connection request in the RA procedure. Before going deeper to the method of FIG. 3, let us briefly take a look at RA process shown in FIG. 5 between the UE 120 and the ng-eNB 110. Alternatively, the unit marked with reference numeral 150 could be e.g. the gNB 150. In contention based random access process, showed in FIG. 5, the UE 120 selects one of the available RACH preambles and transmits it in a message (Msg) 1 from the UE 120 to eNB/gNB 110/150. The UE also needs to derive identity to the network so that network can address it in next step. The identity which UE will use is called RA-RNTI (random access radio network temporary identity). In next step, the (ng-)eNB/gNB 110/150 sends a random access response (RAR) to UE 120 as Msg2 addressed to UE with the relevant RA-RNTI. Msg2 may by default carry the following information: Temporary C-RNTI, which is another identity given to the UE 120; timing advance (TA) value, which provides means for the UE to compensate for the round trip delay caused by UE's distance from the eNB/gNB; and an uplink grant resource, which is assigned as an initial resource to UE so that it can use uplink shared channel. Then, by using the uplink shared channel, the UE 120 sends Msg3 to the network. This Msg3 may be called "RRC connection request message". At this point the UE is identified by the temporary C-RNTI. Thereafter, the eNB/gNB may send Msg4 to the UE for contention resolution. All Msg1, Msg2, Msg3, Msg4 may be MAC level messages. After the RRC connection request of Msg3 is processed, a RRC response will be sent by (ng-)eNB/gNB to the UE 120. In an embodiment, although not shown, the RRC message (e.g. the RRC Connection Setup message) may be multiplexed with the Msg4 (i.e. sent with the MAC contention resolution CE). The concept of RA process is considered to be well-known to a skilled person and is not discussed further in-depth here.

After having received the connection request, the gNB knows that there is a UE 120 in an idle or in an inactive state requesting connection with the 5G. In step 302, the gNB may determine, before the user equipment is switched to the connected state in the 5G, whether a second RAT (eLTE in this example) is more suitable to serve the user equipment than the 5G RAT. It may be noted that there may be a plurality of others RATs, and each may be considered when deciding if some of those other RATs is more suitable than the first RAT. Such other RATs may include e.g. LTE, UMTS, WLAN, etc. For the sake of simplicity, eLTE is used as an example here for the second RAT.

Upon deciding that the eLTE is more suitable, the gNB may in step 304 provide the UE 120 with connection information of the eLTE causing/commanding/enabling the UE 120 to directly connect with the eLTE, instead of the 5G. That is the UE may be caused/commanded to switch from 5G RRC inactive or from 5G RRD idle mode directly to the EUTRA RRC connected mode, without first entering the RRC connected mode and without performing cell-reselections in the idle or RRC inactive mode. Such state changes are shown in FIG. 2, wherein the proposed new state changes are depicted with long-dashed lines. In case the 5G network is able to provide the requested service adequately (of for some other reason), then the gNB may decide to connect the UE 120 with the 5G, per the request from the UE.

In an embodiment, the eLTE is considered to be more suitable than the 5G to serve the UE 120 if the eLTE has sufficient radio resources available for the user equipment and the 5G does not have sufficient radio resources available for the UE 120 or the gNB determines that eLTE is better suited for the UE requested service. For example, when UE 120 is camping on the RRC inactive state, the 5G RAT (e.g. gNB) may be aware of UE context and capability before the UE 120 even enters to the RRC connected mode in the 5G. This may be because the UE has earlier been in RRC connected state, and then just moved to the inactive state, and the 5G gNB may thus know the context from the previous RRC connected state. Therefore, the gNB may know whether the UE is 5G-only UE, or whether the UE can be served by the eLTE instead (or additionally as in dual connectivity of eLTE and 5G). In one embodiment, however, the UE 120 may provide and the network node (e.g. gNB) may receive an indication of the capability of the UE 120 to be served by one or more other RATs (e.g. eLTE). The indication may indicate least one RAT the user equipment is capable to operate with. This indication may be provided e.g. in the RRC connection Request message when the UE requests the state change. This allows the network to use direct resource allocation also for the UEs in IDLE state for which the 5g RAT may not otherwise know the UE context and capabilities.

Furthermore, the gNB may know the available resources in both RATs (eLTE and 5G) due to collocated architecture or via inter-RAT negotiations. When the radio network (e.g. 5G) has the UE context and knows the available resources for at least these two different radio technologies (5G and eLTE), the gNB may assign the UE 120 to the best RAT (eLTE in this example), without allocating the resources first to the 5G. This is beneficial in terms of latency reduction.

In one embodiment, the capabilities of the UE play a role when deciding which RAT to choose for the UE. E.g. UE bandwidth capability may be an important factor to consider before deciding which RAT is best to serve the UE.

Regarding step 302, in one embodiment the gNB may detect the above-explained establishment cause for the connection request and then make the determination whether the eLTE is more suitable to serve the UE 120 than the 5G at least partly based on the establishment cause. That is, the determination may in an embodiment be a request specific. E.g. the establishment cause may indicate to the gNB that the UE needs to send a short emergency message. In such case connecting with the 5G may be beneficial to keep the latencies lower (assuming 5G has enough capacity and resources to handle the request and consecutive communication). On the other hand, if the establishment cause indicates that the need for the connection establishment is for exchanging large amount of delay tolerant data with the RAT, then eLTE may be selected for the connection establishment (assuming eLTE has needed resources available). These are merely nonlimiting examples and other determinations regarding which RAT to choose based on the establishment cause are possible.

In one embodiment, the determination whether the eLTE is more suitable to serve the UE 120 than the 5G is based on the capabilities of the UE. If the UE is 5G-only UE, then the UE cannot be commanded to connect with eLTE or with any other possible second RAT candidate.

In one embodiment, the determination whether the eLTE is more suitable to serve the UE 120 than the 5G is based on at least one of the following with respect to the 5G and/or the eLTE: available resources, traffic load, type, available bandwidth, available bandwidth with respect to capabilities of the UE. Thus, the radio network (e.g. 5G) analyses the load and other factors (RAT type, bandwidth, slices, other services) affecting the RAT selection, and then in step 304 may cause provision of the connection information to the UE 120. For example, if the UE is not capable to operate with the second RAT type (e.g. UMTS) or with the second RAT bandwidth, then the gNB will not command the UE to connect with UMTS as the second RAT. If the available bandwidth of the second RAT is not large enough to serve the UE's needs (known e.g. from the establishment cause), the gNB may not command the UE to connect with the second RAT. If the service type requested by the UE is not available in the second RAT, then the gNB may not command the UE to connect with the second RAT.

Figure 6A:
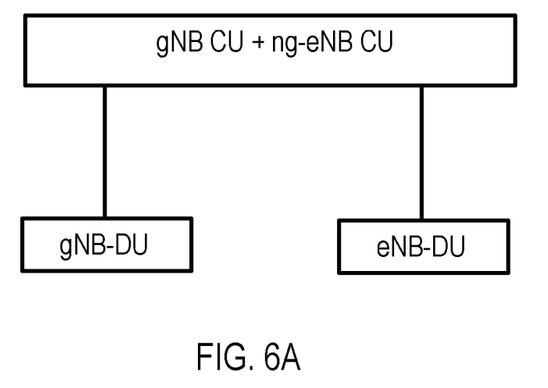
FIGS. 6A to 6C show some architectures for collocated and non-collocated radio access networks, according to some embodiments.

As explained, the 5G and the 4G (eLTE) control nodes (e.g. ng-eNB CU and gNB CU) may be collocated/combined. This is shown in FIG. 6A. In such embodiment, the 5G CU may be aware of the eLTE characteristics and resource usage. Then the gNB CU may determine the characteristics and the currently available resources of the eLTE and compare those to currently available resources of the 5G to determine whether the eLTE is more suitable to serve the UE 120 than the 5G.

Figure 6B:
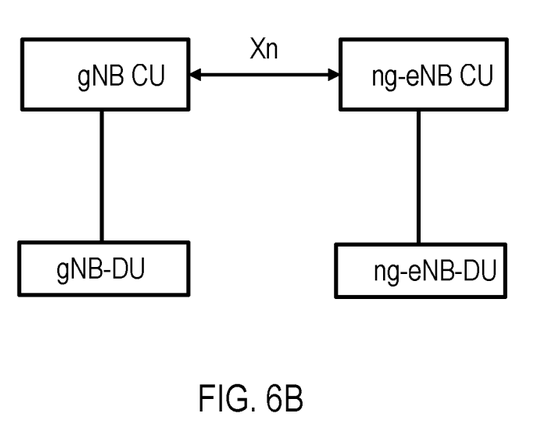
Figure 6C:
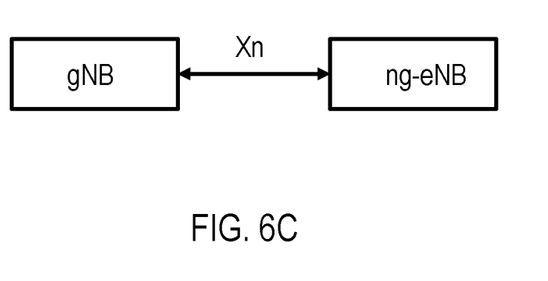

In another embodiment, as shown in FIGS. 6B and 6C, the gNB-CU, or the gNB in general, is not collocated with the eNB-CU or eNB serving the eLTE RAT. In such case the method may further comprise negotiating over an interface between the 5G and eLTE of FIG. 6B regarding characteristics/properties/situation of the eLTE. The characteristics/properties/situation may include e.g. currently available resources for the UE 120 in the eLTE, type (cellular, WLAN) of the second RAT, frequency slicing capability, and/or services available in the second RAT. A new signalling procedure may be introduced over the interface, such as over the Xn interface, to inform the target node (ng-eNB or ng-eNB CU) about the UE's arrival to the eLTE. This may save considerable amount of time compared to a RRC Connection Reject followed by RRC Connection re-establishment to the LTE. Instead the gNB (gNB-CU) may retrieve such information regarding the available resources of the LTE and compare those to the characteristics (including currently available resources) of the 5G to determine whether the LTE is more suitable to serve the user UE 120 than the 5G. Thus, the proposed solution is not only applicable to the joint node architecture of FIG. 6A but also to non-collocated single node architecture where the two radio technologies, like eLTE and 5G, are not controlled by the same CU or by collocated CUs. In this case the UE 120 may make the RA procedure in the first radio technology and the CU and/or DU of the first radio technology may request second RAT characteristics over the Xn interface from the second radio technology. The second radio technology may then respond to the 5G by delivering the needed parameters (or a container) back to the first radio technology, which can then assign the UE 120 directly to the allocated second radio technology based on the parameters (=connection information including e.g. PRACH parameters, C-RNTI, etc.). This may allow the UE to perform a contention-free RACH access at the target node (ng-eNB). In some embodiments the ng-eNB may already allocate the needed resources to the UE and keep those in reserve until the UE requests connection to the eLTE.

In an embodiment, the connection information, from the gNB to the UE 120 in step 304, may be sent in an RRC connection setup-message of the initial access process (e.g. in the RA-procedure). Thus, the solution may also introduce new parameters to the RRC Connection Setup message. The assignment can be done e.g. in a new IE of the RRC connection setup-message. In another embodiment, the assignment (i.e. the transmission of the connection information) to the UE may be conveyed with a new message. This allows the UE to change state directly from 5G RRC inactive or 5G RRC idle to EUTRA RRC connected state.

Figure 4:
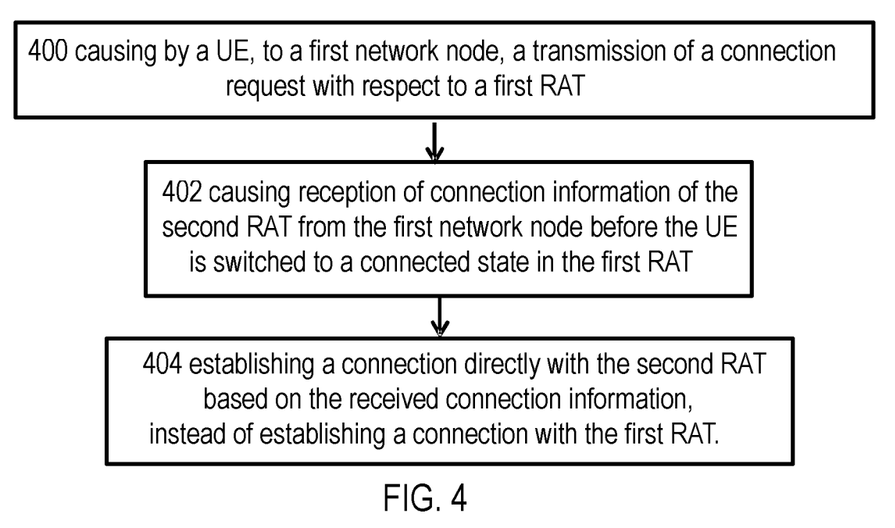

FIG. 4 shows the proposed solution from the point of view of the UE 120. As shown, the UE may in step 400 cause a transmission of the connection request with respect to the first RAT (e.g. the 5G). The request may be sent to the first network node (such as the gNB, gNB-CU, gNB-DU). The first network node may serve/control at least the first RAT. In case of a joint/combined architecture, the first network node (such as the gNB-CU) may also comprise the functionalities to serve/control (at least partially) the second RAT (such as the eLTE). In step 402, the UE 120 may cause a reception of connection information of the second RAT from the first network node before the UE 120 is switched to a connected state in the first RAT. Then the UE 120 may in step 404 establish a connection directly with the second RAT (e.g. eLTE) based on the received connection information, instead of establishing a connection with the first RAT (e.g. 5G).

Figure 10:
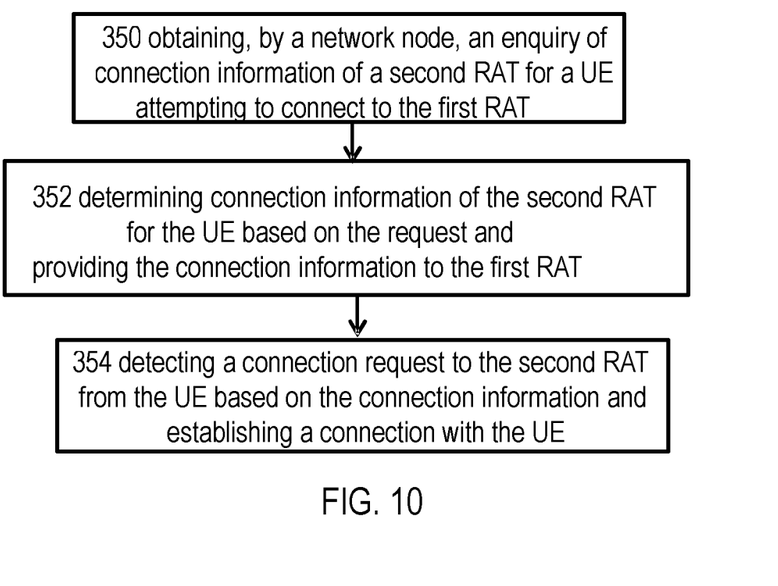

From the second network node point, such as the ng-eNB, ng-eNB-CU or ng-eNB-DU, point of view as shown in FIG. 10, the method may comprise in step 350 obtaining an enquiry of connection information for a UE attempting to connect to the first RAT. The enquiry may be for characteristics of the second RAT (including e.g. the available radio resources of the second RAT). The second RAT may be served or controlled by the second network node. The obtaining may be carried out by e.g. causing reception of the enquiry over an interface, such as the Xn interface in case of non-collocated scenario, or by internally obtaining/receiving the request from a collocated first network node. The request may be received from the first network node serving or controlling the first RAT (e.g. 5G).

In step 352, the second network node may determine the connection information of the second RAT for the UE based on the request and provide the connection information to the first RAT, in order to enable the UE to perform an expedited connection establishment with the second RAT. This could be a non-UE associated request executed on a periodic request.

The second network node may further obtain UE-information that the UE may request connection with the second RAT. This may include the first RAT requesting the second RAT to also allocate resources for a possible contention-free access. The UE information may comprise details about the UE, such as physical random access channel (PRACH) parameters, including a preamble, UE identifier, QoS profile requested and UE capability. In one implementation of a collocated scenario, the same node controls both resources and then the node (e.g. gNB) may make the needed allocations also for/from LTE, in a similar manner as it would make for/from 5G only case.

In step 354, the second radio network node may then detect a connection request to the second RAT from the UE based on the connection information and establish a connection with the user equipment. The connection may be established in an expedited manner based on the received UE information from the first network node and based on the connection information used by the UE 120 in the request. The expedited manner may refer to the 2-step initial access process, as described.

Figure 7:
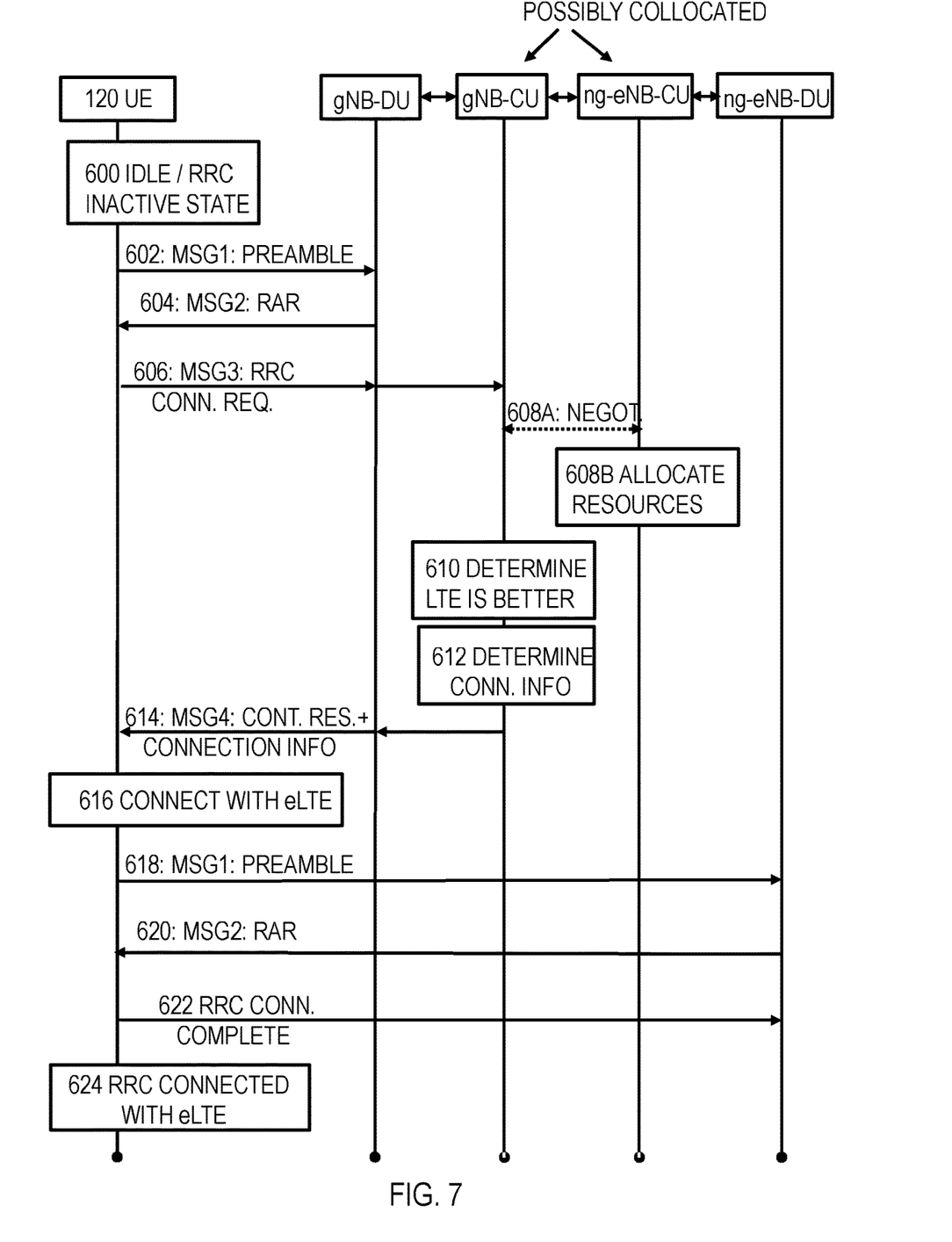
FIG. 7 illustrates a signaling flow diagram, according to an embodiment.

Let us look at the process also in form of a signaling flow diagram of FIG. 7. The Figure assumes a cloud-based combined-CUs with direct allocation between RATs. I.e. a joint gNB+ng-eNB (collocated) architecture may be assumed, but as described above, the solution is applicable also to non-collocated scenarios.

In step 600, the UE is in an RRC idle or in an RRC inactive state in the 5G RAT. Thereafter, the UE determines that switch to an RRC connected state is needed and the UE thus request connection establishment with the 5G RAT. This may happen, as described above, via the RA process. The UE sends a random access preamble in step 602 and receives a random access response in step 604. In step 606 the UE sends RRC connection requests to the gNB. Alternatively, when the UE is moving from 5G RRC INACTIVE, the RRC message used in step 3 may be an RRC Connection Resume, instead of the RRC connection request message. Based on this message the gNB determines that the low activity UE requires a switch to the RRC connected state in the 5G RAT.

Instead of directly proceeding with establishing the connection to the 5G, the gNB considers in step 610, based on the connection request (e.g. establishment cause), based on the capabilities of the UE, and/or based on the characteristics of the second RAT (e.g. the available resources of the 5G RAT and at least one other RAT (e.g. eLTE)), whether the UE would be better off with some other RAT than the 5G RAT. Other determination criteria may exist as well.

This may require negotiation between the RATs, as shown with optional step 608A. The negotiation may take place between the CUs of the RATs in case of non-collocated scenario. The negotiation may be for the connection information, e.g. for the currently available resources and/or for other parameters/IEs/characteristics needed for determining which RAT is most suitable for the UE. E.g. when such eLTE resource request/enquiry takes place over Xn, the gNB may send e.g. an UE identifier, QoS profile requested and the UE capability to the eLTE, so that the eLTE may determine sophistically the connection information, e.g. whether to allocate resources to the UE, in step 608B. In case the gNB and the ng-eNB are collocated or if the gNB controls also the eLTE or if the gNB is otherwise aware of eLTE resource management, the gNB may perform the resource allocation step 608B and the determination step 610 even without the negotiation step 608A.

The connection information (e.g. resources) reserved in step 608B for the UE may be stored for a predetermined period at the second RAT. If the UE does not attempt connection establishment with the second RAT during the predetermined period of time, the resources may be released after the predetermined period. In other words, the second RAT may provide both 1) the information needed for the first RAT to decide which RAT is most suitable to serve the UE and 2) the connection information (e.g. resources of the second RAT for the UE's initial access to the second RAT) to the first RAT during the negotiation 608A regardless of whether the first RAT thereafter decides to instruct the UE to connect with the second RAT or not. This may cause some increment in the signaling overhead of the negotiation 608A, but gained latency reduction outweighs the overhead in the signalling to carry the additional IEs. Thus, any possible resources for the UE's connection attempt with the second RAT may be in an embodiment allocated during the negotiation 608A.

In another embodiment, there may be a second negotiation between eLTE and 5G after the 5G has decided to instruct the UE to connect with eLTE. This second negotiation may be used to require the connection information for the UE's connection establishment attempt with the second RAT, whereas the first negotiation 608A may be only for determining whether the second RAT is more suitable. If it is more suitable, then the second negotiation is triggered.

Upon receiving the RRC Connection Request-message or the RRC Connection Resume-message in step 606, the gNB proceeds with analysing one or more RATs, cells and bandwidths parts (BWPs) that the UE could use based on e.g. the radio coverage and the UE's radio capabilities. As said, when the same CU and/or DU controls the relevant different radio technologies (5G and eLTE in this example), the CU may have the information about possible RATs for the UE, based on automatic neighbor relation (ANR) solutions in the 5G where the inter-RAT neighbours of a cell are maintained or based on operation and maintenance (OAM) mapping with respect to radio coverages, even without any measurements from the UE. An alternative is to request such radio coverages from the UE. The UE may make such measurements based on reference signal received powers (RSRPs) of different RATs, as one example, and then inform the gNB about which cells and/or RATs are available for the UE. Such indication, either explicit or implicit, may be carried in the RRC request connection request, for example. E.g. the UE could send the measurement results in the RRC connection request. This could be controlled via SIB, if needed.

In case there are no resources available in the first radio technology (e.g. 5G) or the gNB knows e.g. based on the establishment cause of the connection request that another RAT (e.g. eLTE) is better for the service, the gNB may in step 610 determine that eLTE is more suitable to serve the UE. This determination may take a plurality of information elements into account, such as the characteristics/properties of the second RAT and of the first RAT (including the available resources, type, services, compatibility with the UEs capabilities), the capabilities of the UE, etc.

In step 612, the gNB determines the connection information required by the UE to connect directly with the eLTE. As said, in some embodiments this may include (although not shown for the collocated scenario) negotiation between the RATs in terms of allocating resources directly from the better suitable RAT (in this example, from the eLTE). In some other embodiment, the required connection information may be received already earlier (e.g. during step 608A) from the second RAT. In some other embodiment, the gNB-CU is collocated with ng-eND-CU, and may thus have knowledge of the needed connection information without negotiation.

In an embodiment, the connection information is sent to the UE in step 614. The connection information may be sent among the Msg4, which carries also the RRC connection setup message, of the RA process. In an embodiment the connection information comprises an indication of allocated resources of the eLTE for the UE 120. That is, the second RAT may allocate such resources to the soon-to-be-arriving UE 120 e.g. when the first RAT enquiries about the connection information and/or indicates that an UE will or may be requesting connection with the second RAT. The second RAT may indicate the resources to the first RAT which forwards those to the UE as the connection information. This may expedite the UE's connection establishment with the eLTE, compared to a scenario where the UE 120 would request connection with the eLTE without such connection information. In some embodiments, the allocated resources comprise at least signaling radio bearer (SRB) and UE specific configuration for the initial access for the second RAT. These may comprise e.g. one of the following: preamble information, a physical uplink control channel (PUCCH) allocation, cell radio network temporary identifier (C-RNTI) indication, and scheduling request (SR) allocation. The UE 120 may apply these e.g. for the direct connection request from the 5G RRC inactive state or from the 5G RRC idle state to the LTE RRC connected state.

After receiving the connection information, the UE may in step 616 decide to connect directly with the eLTE, instead of the initially targeted 5G (i.e. before the user equipment is switched to the RRC connected state in 5G). The connection information enables the UE to speed up the connection process with the eLTE. This is because the connection information causes/enables the UE to perform a connection request with the second RAT (eLTE) in a 2-step contention free RA procedure. The two-step process is shown with reference numerals 618 and 620 in FIG. 7. Such 2-step process includes the UE sending a random access preamble (e.g. C-RNTI) to the ng-eNB and the ng-eNB responding with a random access response. This enables the UE to switch from an RRC idle or an RRC inactive state in the first RAT directly to an RRC connected state in the second RAT. In step 622 the RRC connection complete message is sent to the eLTE by the UE, without needing to go through time-consuming contention resolutions. As such, the UE has efficiently switched its RRC state to EUTRA RRC connected when reaching step 624.

Although described above that the 5G is the first network and gNB is the first network node performing the method of claim 3 (and the second RAT is/operates according to eLTE), in some other embodiments, the proposed methods may be performed by eLTE eNB. In such case the ng-eNB receives the connection request and it decides whether to command the UE to directly connect with 5G RAT, instead of the ng-eNB, in case the 5G provides better resources for the UE. It needs to be noted that the proposed solution is not limited to 4G and 5G, but to any other RATs (such as 3G, E-LTE, and beyond 5G systems). E.g. applying the solution to eLTE may be beneficial since then the negotiations between the RAT may go via the Xn interface. An eNB does not typically have Xn with gNB. In such case, the implementation of the proposed method may rely on communication through the core network. Moreover, the methods may apply also to UEs camping in IDLE modes, instead of the low-activity modes (RRC light connection and RRC inactive). Thus, the functionality may be taken in to use also without the RRC INACTIVE state.

The proposed solution provides advantages to an alternative solution where the UE may contact the eLTE via 4-step RA procedure directly from the 5G inactive mode, after first being connected with 5G and then having moved to the RRC inactive state in 5G. This is because the UE in such case would need to perform a 4-step RA procedure with the eLTE and the eLTE would need to negotiate with the 5G control node e.g. for authentication of the UE. These cause additional delays before the UE is in RRC connected state with the LTE. Also, in some other solutions the UE might end up connecting with the non-optimal RAT. However, this may be avoided with the proposed solution where the network (not the UE) decides and instructs the UE to connect with the RAT that is determined to be the best for this particular UE with this particular request. Furthermore, in some other solutions, the UE may decide to move to the LTE e.g. due to bad 5G coverage. In the current proposed solution, the assumption may be that both RAT provide decent coverage, and thus the UE would typically first request connection from the RAT in which the UE is currently camping. So, one advantage of the proposed solution may be that this is a network-controlled functionality where the UE may be controlled to enter the best RAT, in a controlled manner that works also in case of good coverages to both RATs. Other benefits include e.g. load sharing. Some other solutions require state changes between 5G and LTE via reselections and fall-backs. These are time consuming actions and should be avoided in case of urgent connection requests.

Figure 8:
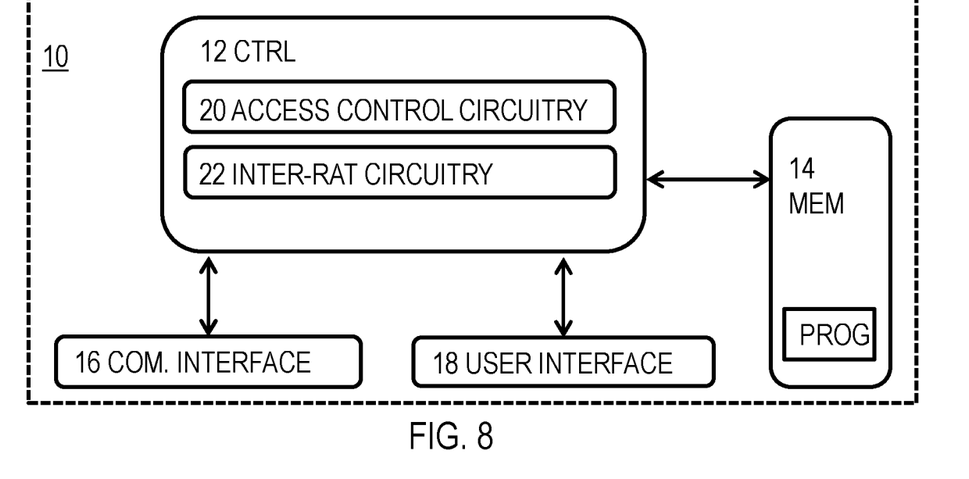
FIGS. 8 to 9 illustrate apparatuses, according to some embodiments.

An embodiment, as shown in FIG. 8, provides an apparatus 10 comprising a control circuitry (CTRL) 12, such as at least one processor, and at least one memory 14 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor based memory devices, flash memory, magnetic memory devices and systems, optical memory devices and systems, fixed memory and removable memory.

In an embodiment, the apparatus 10 may be or be comprised in a first network node of the first network, such as in gNB/gNB-CU/gNB-DU of 5G or in eNB/eNB-CU/eNB-DU of EUTRA. In an embodiment, the apparatus 10 is or is comprised in the network node 110 or 150. The apparatus may be caused to execute the functionalities of some of the above described processes, such as the steps of FIG. 3.

In another embodiment, the apparatus 10 may be or be comprised in a second network node of the second network, such as in eNB/eNB-CU/eNB-DU of LTE or in gNB/gNB-CU/gNB-DU of 5G. In an embodiment, the apparatus 10 is or is comprised in the network node 110 or 150. The apparatus may be caused to execute the functionalities of some of the above described processes, such as the functionalities of the second network node.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation. In an embodiment, the server may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 10 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be located in a same entity communicating via a wired connection, etc. It should be understood that the edge cloud or edge cloud server may serve a plurality of radio nodes or a radio access networks. In an embodiment, at least some of the described processes may be performed by the central unit. In another embodiment, the apparatus 10 may be instead comprised in the distributed unit, and at least some of the described processes may be performed by the distributed unit.

In an embodiment, the execution of at least some of the functionalities of the apparatus 10 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 10 controls the execution of the processes, regardless of the location of the apparatus and regardless of where the processes/functions are carried out.

The apparatus may further comprise communication interface (TRX) 16 comprising hardware and/or software for realizing communication connectivity according to one or more communication protocols. The TRX may provide the apparatus with communication capabilities to access the radio access network, for example. The apparatus may also comprise a user interface 18 comprising, for example, at least one keypad, a microphone, a touch display, a display, a speaker, etc. The user interface may be used to control the apparatus by the user.

The control circuitry 12 may comprise an access control circuitry 20 for controlling whether UEs are allowed to access the network of the apparatus, according to any of the embodiments. The control circuitry 12 may comprise an inter-RAT circuitry 22 e.g. for negotiation between RATs, for determining which RAT is best to serve the UE, and for controlling a plurality of RATs, in case of collocated central nodes, according to any of the embodiments.

Figure 9:
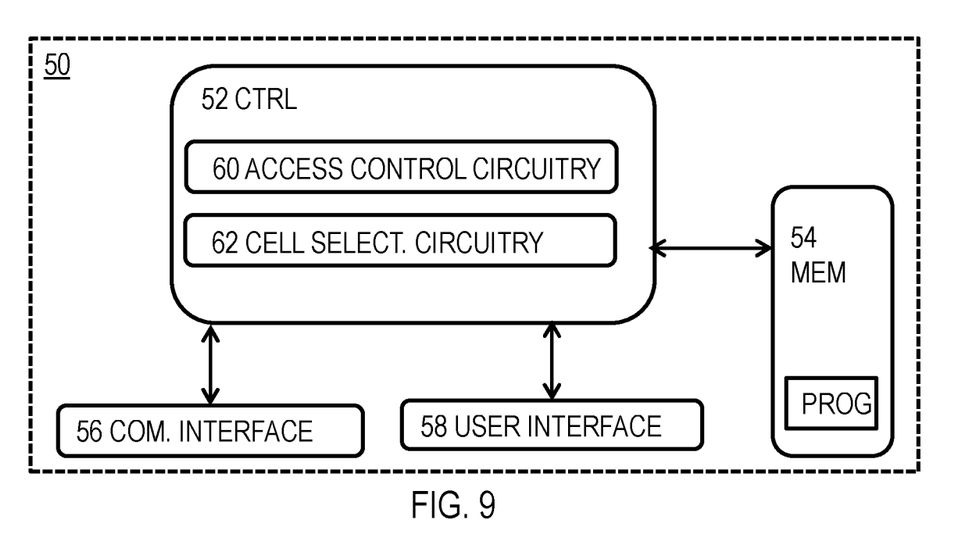

An embodiment, as shown in FIG. 9, provides an apparatus 50 comprising a control circuitry (CTRL) 52, such as at least one processor, and at least one memory 54 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor based memory devices, flash memory, magnetic memory devices and systems, optical memory devices and systems, fixed memory and removable memory.

In another embodiment, the apparatus 50 may comprise the terminal device of a cellular communication system, e.g. a user terminal (UT), a computer (PC), a laptop, a tabloid computer, a cellular phone, a mobile phone, a communicator, a smart phone, a palm computer, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

The apparatus may further comprise communication interface (TRX) 56 comprising hardware and/or software for realizing communication connectivity according to one or more communication protocols. The TRX may provide the apparatus with communication capabilities to access the radio access network, for example. The apparatus may also comprise a user interface 58 comprising, for example, at least one keypad, a microphone, a touch display, a display, a speaker, etc. The user interface may be used to control the apparatus by the user.

The control circuitry 52 may comprise an access control circuitry 60 for controlling access requests to one or more RATs, according to any of the embodiments. The control circuitry 52 may further comprise a cell selection circuitry 62 for selecting between different cells and different RATs, according to any of the embodiments.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components, in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a list of some aspects of the invention.

According to a first aspect, there is provided a method comprising: detecting, by a first network node from a user equipment, a connection request to a first radio access technology, RAT; determining, before the user equipment is switched to a connected state in the first RAT, whether a second RAT is more suitable to serve the user equipment than the first RAT; and upon deciding that the second RAT is more suitable, causing a provision of connection information of the second RAT to the user equipment, where-in the connection information causes the user equipment to directly connect with the second RAT instead of the first RAT.

Various embodiments of the first aspect may comprise at least one feature from the following bulleted list:
- detecting the connection request in an initial access procedure; and allocating the connection information of the second RAT to the user equipment in an RRCConnectionSetup-message of the initial access procedure.
- detecting an establishment cause for the connection request, wherein the determination whether the second RAT is more suitable to serve the user equipment than the first RAT is based on the establishment cause.
- wherein the determination whether the second RAT is more suitable to serve the user equipment than the first RAT is based on at least one of the following with respect to the first and/or the second RAT: available resources, traffic load, type, available bandwidth, available bandwidth with respect to applicable bandwidth for the user equipment.
- wherein the first network node is not collocated with a second network node serving the second RAT, and the method further comprises: negotiating over an interface between the first and the second RAT regarding characteristics of the second RAT; and comparing those to characteristics of the first RAT for determining whether the second RAT is more suitable to serve the user equipment.
- wherein the provided connection information causes the user equipment to perform a connection request with the second RAT in a 2-step contention free initial access procedure.
- wherein the connection information comprises an indication of allocated resources of the second RAT for the user equipment during the connection establishment with the second RAT.

According to a second aspect, there is provided a method comprising: obtaining by a network node, from a first radio access technology (RAT), an enquiry of connection information of a second RAT for a user equipment attempting to connect to the first RAT; determining connection information of the second RAT for the user equipment based on the request and providing the connection information to the first RAT; and detecting a connection request to the second RAT from the user equipment based on the connection information and establishing a connection with the user equipment.

Various embodiments of the second aspect may comprise at least one feature from the bulleted list under the first aspect.

According to a third aspect, there is provided a method comprising: causing, by a user equipment to a first network node, a transmission of a connection request with respect to a first radio access network, RAT; causing reception of connection information of the second RAT from the first network node before the user equipment is switched to a connected state in the first RAT; and establishing a connection directly with the second RAT based on the received connection information, instead of establishing a connection with the first RAT.

Various embodiments of the third aspect may comprise at least one feature from the following bulleted list:
- wherein the connection request is for re-questing a switch to an RRC connected state either from an RRC idle state or from an RRC inactive state.
- providing the connection request in an initial access procedure; and causing reception of the connection information of the second RAT in an RRCConnectionSetup-message of the initial access procedure from the first network node.
- wherein the direct connection establishment with the second RAT comprises a switch either from an RRC idle state or from the RRC inactive state in the first RAT to an RRC connected state in the second RAT, and wherein the method further comprises: performing a connection request with the second RAT in a 2-step contention free initial access procedure based on the connection information.
- providing to the first network node an indication of at least one RAT the user equipment is capable to operate with.

According to a fourth aspect, there is provided an apparatus, comprising at least one processor and at least one memory including a computer program code, wherein the at least one memory and the computer program code are configured, with the at least one processor, to cause the apparatus to perform operations comprising: detecting, by a first network node from a user equipment, a connection request to a first radio access technology, RAT; determining, before the user equipment is switched to a connected state in the first RAT, whether a second RAT is more suitable to serve the user equipment than the first RAT; and upon deciding that the second RAT is more suitable, causing a provision of connection information of the second RAT to the user equipment, wherein the connection information causes the user equipment to directly connect with the second RAT instead of the first RAT.

Various embodiments of the fourth aspect may comprise at least one feature from the bulleted list under the first aspect.

According to a fifth aspect, there is provided an apparatus, comprising at least one processor and at least one memory including a computer program code, wherein the at least one memory and the computer program code are configured, with the at least one processor, to cause the apparatus to perform operations comprising: obtaining by a network node, from a first radio access technology (RAT), an enquiry of connection information of a second RAT for a user equipment attempting to connect to the first RAT; determining connection information of the second RAT for the user equipment based on the request and providing the connection information to the first RAT; and detecting a connection request to the second RAT from the user equipment based on the connection information and establishing a connection with the user equipment.

Various embodiments of the fifth aspect may comprise at least one feature from the bulleted list under the first aspect.

According to a sixth aspect, there is provided an apparatus, comprising at least one processor and at least one memory including a computer pro-gram code, wherein the at least one memory and the computer program code are configured, with the at least one processor, to cause the apparatus to per-form operations comprising: causing, by a user equipment to a first network node, a transmission of a connection request with respect to a first radio access network, RAT; causing reception of connection information of the second RAT from the first network node before the user equipment is switched to a connected state in the first RAT; and establishing a connection directly with the second RAT based on the received connection information, instead of establishing a connection with the first RAT.

Various embodiments of the sixth aspect may comprise at least one feature from the bulleted list under the third aspect. In one embodiment, the apparatus of the sixth aspect a user equipment.

According to a seventh aspect, there is provided a computer program product embodied on a distribution medium readable by a computer and comprising program instructions which, when loaded into an apparatus, execute the method according to any of aspects 1 to 3.

According to an eight aspect, there is provided a computer program product comprising program instructions which, when loaded into an apparatus, execute the method according to any of aspects 1 to 3.

According to a ninth aspect, there is provided an apparatus, comprising means for performing the method according to any of aspects 1 to 3. In one embodiment, the apparatus comprises at least one processor; and at least one memory comprising computer program code, and wherein the at least one memory and the computer program code are configured, with the at least one processor to cause the apparatus to provide said means.

According to a tenth aspect, there is provided a computer system, comprising one or more processors; at least one data storage, and one or more computer program instructions to be executed by the one or more processors in association with the at least one data storage for carrying out a process according to any of aspects 1 to 3.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor and at least one memory including a computer program code, wherein the at least one memory and the computer program code are configured, with the at least one processor, to cause the apparatus to:
detect, from a user equipment, a connection request to a first radio access technology (RAT), wherein the apparatus is or is comprised in an access node of the first RAT;
determine, before the user equipment is switched to a connected state in the first RAT, whether a second RAT is more suitable to serve the user equipment than the first RAT; and
upon determining that the second RAT is more suitable, provision connection information of the second RAT to the user equipment, wherein the connection information is configured to cause the user equipment to directly connect with the second RAT instead of the first RAT, and comprises an indication of allocated resources of the second RAT for the user equipment to be used in contention-free connection establishment with the second RAT without first entering the connected state with the first RAT.

2. The apparatus of claim 1, wherein the at least one memory and the computer program code are configured, with the at least one processor, to cause the apparatus further to:
detect the connection request in an initial access procedure; and
allocate the connection information of the second RAT to the user equipment in an RRCConnectionSetup-message of the initial access procedure.

3. The apparatus of claim 1, wherein the at least one memory and the computer program code are configured, with the at least one processor, to cause the apparatus further to:
detect an establishment cause for the connection request, wherein the determination whether the second RAT is more suitable to serve the user equipment than the first RAT is based on the establishment cause.

4. The apparatus of claim 1, wherein the determination whether the second RAT is more suitable to serve the user equipment than the first RAT is based on at least one of the following with respect to the first and/or the second RAT: available resources, traffic load, type, available bandwidth, available bandwidth with respect to applicable bandwidth for the user equipment.

5. The apparatus of claim 1, wherein the apparatus is not collocated with a network node serving the second RAT, and wherein the at least one memory and the computer program code are configured, with the at least one processor, to cause the apparatus further to:
negotiate over an interface between the first and the second RAT regarding characteristics of the second RAT; and
compare those to characteristics of the first RAT for determining whether the second RAT is more suitable to serve the user equipment.

6. The apparatus of claim 1, wherein the provided connection information causes the user equipment to perform a connection request with the second RAT in a 2-step contention free initial access procedure.

7. An apparatus, comprising:
at least one processor and at least one memory including a computer program code, wherein the at least one memory and the computer program code are configured, with the at least one processor, to cause the apparatus to:
obtain, from an access node of a first radio access technology (RAT), an enquiry of connection information of a second RAT for a user equipment attempting to connect to the first RAT, wherein the apparatus is or is comprised in an access node of the second RAT;
determine connection information of the second RAT for the user equipment based on the request and provide the connection information to the first RAT, wherein the connection information comprises an indication of allocated resources of the second RAT for the user equipment to be used in contention-free connection request with the second RAT without first entering a connected state with the first RAT; and
detect a connection request to the second RAT from the user equipment based on the connection information and establish a connection with the user equipment.

8. An apparatus, comprising:

at least one processor and at least one memory including a computer program code, wherein the at least one memory and the computer program code are configured, with the at least one processor, to cause the apparatus to:

cause a transmission to a first network node of a connection request with respect to a first radio access technology (RAT), wherein the first network node is an access node of the first RAT;

cause reception of connection information of the second RAT from the first network node before the apparatus is switched to a connected state in the first RAT, wherein the connection information comprises an indication of allocated resources of the second RAT for the user equipment to be used in contention-free connection request with the second RAT without first entering the connected state with the first RAT; and establish a connection directly with the second RAT based on the received connection information, instead of establishing a connection with the first RAT.

9. The apparatus of claim 8, wherein the connection request is for re-questing a switch to a radio resource control (RRC) connected state either from an RRC idle state or from an RRC inactive state.

10. The apparatus according to claim 8, wherein the at least one memory and the computer program code are configured, with the at least one processor, to cause the apparatus further to:

provide the connection request in an initial access procedure; and cause reception of the connection information of the second RAT in an RRCConnectionSetup-message of the initial access procedure from the first network node.

11. The apparatus according to claim 8, wherein the direct connection establishment with the second RAT comprises a switch either from an RRC idle state or from the RRC inactive state in the first RAT to an RRC connected state in the second RAT, and wherein the at least one memory and the computer program code are configured, with the at least one processor, to cause the apparatus further to:

perform a connection request with the second RAT in a 2-step contention free initial access procedure based on the connection information.

12. The apparatus according to claim 8, wherein the at least one memory and the computer program code are configured, with the at least one processor, to cause the apparatus further to:

provide to the first network node an indication of at least one RAT the apparatus is capable to operate with.

13. The apparatus of claim 8, wherein the apparatus is a user equipment.

* * * * *